(12) United States Patent
Lin et al.

(10) Patent No.: US 7,098,277 B2
(45) Date of Patent: Aug. 29, 2006

(54) POLYPROPYLENE FILMS

(75) Inventors: Chon-Yie Lin, Houston, TX (US); Michael C-C Chen, Bellaire, TX (US); Aspy K. Mehta, Humble, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 41 days.

(21) Appl. No.: 10/343,846

(22) PCT Filed: Aug. 22, 2001

(86) PCT No.: PCT/US01/26192

§ 371 (c)(1), (2), (4) Date: Jun. 9, 2003

(87) PCT Pub. No.: WO02/16480

PCT Pub. Date: Feb. 28, 2002

(65) Prior Publication Data

US 2004/0030050 A1    Feb. 12, 2004

Related U.S. Application Data

(60) Provisional application No. 60/263,368, filed on Jan. 23, 2001, provisional application No. 60/227,101, filed on Aug. 22, 2000.

(51) Int. Cl.
*C08F 110/06* (2006.01)
*C08F 4/52* (2006.01)
*C08F 4/643* (2006.01)

(52) U.S. Cl. .............. 526/134; 526/135; 526/160; 526/348; 526/348.1; 526/351

(58) Field of Classification Search .......... 526/160, 526/134, 351, 348, 348.1, 135
See application file for complete search history.

(56) References Cited

U.S. PATENT DOCUMENTS

| 5,643,847 | A | 7/1997 | Walzer, Jr. ............... 502/117 |
| 6,037,417 | A | 3/2000 | Nguyen et al. ............ 525/240 |
| 6,063,482 | A | 5/2000 | Peiffer et al. ............. 428/213 |
| 6,063,483 | A | 5/2000 | Peiffer et al. ............. 428/213 |
| 6,071,598 | A | 6/2000 | Peiffer et al. ............. 428/213 |
| 6,090,325 | A | 7/2000 | Wheat et al. ............. 264/290.2 |
| 6,143,686 | A | 11/2000 | Vizzini et al. ............. 502/152 |
| 6,143,911 | A | 11/2000 | Fujita et al. ............... 556/11 |
| 6,388,040 | B1 * | 5/2002 | Fujita et al. .............. 526/348 |

FOREIGN PATENT DOCUMENTS

| DE | 199 49 235 A1 | 5/2000 |
| DE | 199 49 235 A1 | 5/2000 |
| EP | 0 628 574 A1 | 12/1994 |
| EP | 0 628 574 B1 | 12/1994 |
| EP | 0 657 477 A2 | 6/1995 |
| EP | 0 657 477 B1 | 6/1995 |
| EP | 0 723 978 A1 | 7/1996 |
| EP | 0 723 978 B1 | 7/1996 |
| EP | 0 905 173 A1 | 3/1999 |
| EP | 0 943 631 A1 | 9/1999 |
| JP | 11-255825 A | 9/1999 |
| WO | WO 98/10016 | * 3/1998 |
| WO | WO 00/12565 | * 3/2000 |

OTHER PUBLICATIONS

Abstract of DE 199 49 235.
Abstract of EP 0 943 631.
Abstract—DE 199 49 235. "Propylene-ethylene-alpha-olefin termpolymers and their manufacture", Fujita et al., Chisso Corp. Japan, Ger. Offen., Copyright 2003 ACS.
Abstract—EP 0 943 631. "Propene homopolymer-propene copolymer blends", Fischer et al., BASF A.G., Germany, Ger. Offen., Copyright 2003 ACS.

* cited by examiner

*Primary Examiner*—Roberto Rabago

(57) ABSTRACT

The present invention provides isotactic polypropylene compositions suitable for cast film applications, cast polypropylene films made therefrom, and processes for forming such films. The novel polypropylene films are formed from film resins having a melt flow ratio of from 6–15 dg/min, with a narrow molecular weight distribution, narrow composition distribution, low level of solvent extractables, and increased film clarity (i.e., decreased haze %) compared to prior art Ziegler-Natta polypropylene film resins. The polypropylene films can be cast from an extruded polypropylene polymer, the extruded isotactic polypropylene polymer being formed by polymerization with a fluorided silica supported catalyst.

10 Claims, 4 Drawing Sheets

POLYPROPYLENE FILMS

CROSS REFERENCE TO RELATED APPLICATIONS

This application claims the benefit of U.S. Provisional Application Nos. 60/227,101, filed Aug. 22, 2000, and 60/263,368, filed Jan. 23, 2001, herein incorporated by reference in their entirety.

FIELD OF THE INVENTION

The present invention relates generally to isotactic polypropylene polymers for non-oriented (cast) films, and also in general to α-olefin polymer films formed from supported metallocene catalysts.

BACKGROUND

A variety of polymeric materials have been used successfully in thin non-oriented (cast) films. A typical film casting process includes the steps of polymer extrusion, melt feeding through a slot die, melt draw-down in the air gap, chill-roll casting, edge-trim slitting, surface treating if necessary, and winding. With the development of faster, more robust winding technologies, cast film line speeds have been increasing in recent years. This increase in line speeds has led to improvements in productivity and manufacturing economics. In this highly competitive segment of the film market, a versatile resin capable of being processed at high line speeds, drawn-down to a thin and uniform web, efficiently quenched to a clear film, and with a good profile of film properties is very desirable.

Polypropylene can be used to make cast film materials having utility in a variety of important commercial applications. The processability and many important end properties of the polymer are closely related to polymer characteristics such as molecular weight, molecular weight distribution ("MWD"), composition distribution ("CD") and stereoregularity, and these properties in turn are influenced by the catalyst system used to make the polypropylene. Since the introduction of polypropylene in the 1950s, it has been a major interest and trend to manipulate these polymer characteristics to address product needs. Conventional Ziegler-Natta catalysts have long been used to produce isotactic polypropylene. The development of efficient metallocene-based catalyst systems has led to the ability to precisely control polymer characteristics, such as molecular weight, molecular weight distribution and composition distribution over a wide range unattainable by the conventional Ziegler-Natta catalysts.

There remains a need for an improved metallocene catalyzed polypropylene suitable for high output film processing, and supported metallocene catalyst systems capable of efficiently producing polypropylene for cast film applications.

SUMMARY OF THE INVENTION

The present invention provides novel isotactic polypropylene compositions suitable for cast film applications, and cast polypropylene films made therefrom. In one embodiment, the present invention provides a polypropylene film having a melt flow rate ("MFR") of from 6–15 dg/min in one embodiment, and from 9–12 dg/min in another embodiment, with a narrow molecular weight distribution, narrow composition distribution, low level of solvent extractables, and increased film clarity (i.e., decreased haze %) compared to prior art Ziegler-Natta polypropylene films. In this embodiment, the polypropylene film is cast from an extruded polypropylene polymer, the extruded polypropylene polymer being formed by polymerization with a novel fluorided silica supported catalyst.

In another embodiment, the present invention provides a process for producing a polypropylene film having an MFR of from 6–15 dg/min in one embodiment, and from 9–12 dg/min in another embodiment, with a narrow molecular weight distribution, narrow composition distribution, low level of solvent extractables, and increased film clarity compared to prior art Ziegler-Natta polypropylene films. The xylene extractables (or solubles) level of the polymer is less than 2 wt % in one embodiment, less than 1.5 wt % in another embodiment, and less than 1% in another embodiment, the wt % relative to the total polymer. The recoverable compliance for the polymers of the invention is from 0.5 to 1.8 $(Pa^{-1} \times 1^{-4})$ in one embodiment, and from 0.6 to 1.5 $(Pa^{-1} \times 1^{-4})$ in another embodiment. Further, the MWD (Mw/Mn) is less than 3 in one embodiment, less than 2.8 in another embodiment, and less than 2.5 in yet another embodiment.

The process includes the steps of forming a polypropylene polymer by polymerization of propylene monomers in the presence of a fluorided silica supported catalyst, and casting the resultant polypropylene to form a cast polypropylene film having the above-described properties.

In another embodiment, the present invention provides a polypropylene film produced by a process including the steps of forming a polypropylene polymer by polymerization of propylene monomers and at least one α-olefin or ethylene comonomer in the presence of a fluorided silica supported catalyst, and casting the resultant polypropylene to form a cast polypropylene film.

In another embodiment, the present invention provides articles of manufacture formed of or including a cast polypropylene film as described herein.

DETAILED DESCRIPTION OF THE INVENTION

Figure 1:
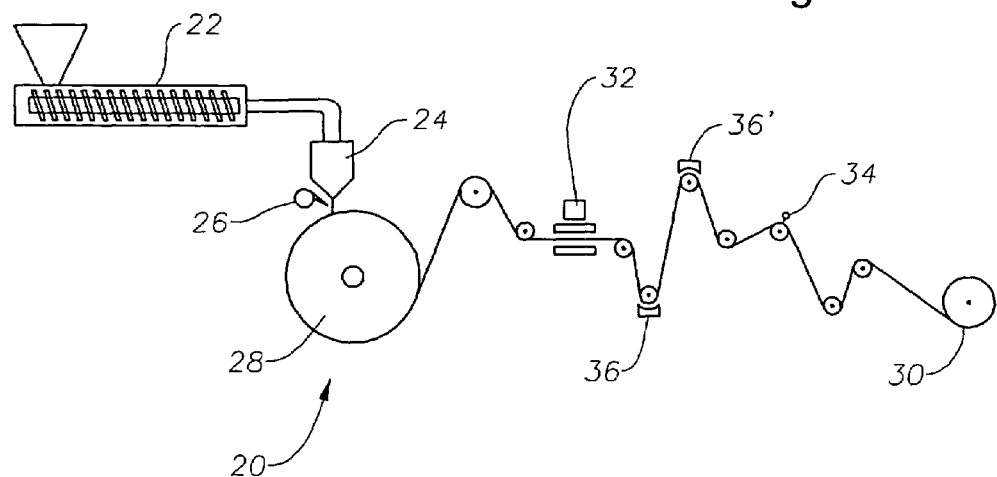
FIG. 1 shows a simplified schematic diagram of a typical casting apparatus.

The present invention provides polypropylene polymers suitable for cast film applications, having improved processability and film characteristics, such as film clarity. These advantageous features are achieved by using a novel metallocene catalyst to form the polypropylene film resins, i.e., the resins used to form the films of the present invention. Resins used to form the present films, formed as described below, have an MFR of 6–15 dg/min in one embodiment, and from 9–12 dg/min in another embodiment.

The polymers of α-olefins of the present invention can be formed with a supported metallocene catalyst system. Although the following materials discuss preferred supported metallocene catalyst systems in great detail, it should be appreciated that the catalyst system can be any conventional supported metallocene catalyst system, and the invention is not limited to the preferred systems described herein.

Preferably, the metallocene catalyst system is the product of contacting at least three components: (1) one or more metallocenes; (2) one or more activators; and (3) one or more fluorided support compositions.

Definitions

As used herein, the phrase "fluorided support" or "fluorided support composition" means a support, desirably particulate and porous, which has been contacted with at least one inorganic fluorine containing compound. For example, the fluorided support composition can be a silicon dioxide support wherein a portion of the silica hydroxyl groups has been replaced with fluorine or fluorine containing compounds.

As used herein, the numbering scheme for the Periodic Table Groups are used as in HAWLEY'S CONDENSED CHEMICAL DICTIONARY 852 (13th ed. 1997).

As used herein, the term "polypropylene" refers to homopolymers or copolymers made propylene derived units, and $C_3$ to $C_{12}$ α-olefin derived units when a copolymer.

As used herein, the terms "catalyst system" and "metallocene catalyst system" include at least one or more metallocenes, and at least one secondary component such as activators and cocatalysts, of which alumoxanes and boranes are broad classes of such compounds, and at least one support such as a silica support which may be fluorided which may also be present.

Metallocene Component

The terms "catalyst system" and "metallocene catalyst system" include at least a primary catalyst component such as a metallocene, and secondary components such as activators and cocatalysts, of which alumoxanes and boranes are broad classes of such compounds which may also be present, and a support such as a silica support that may be fluorided which may also be present.

The catalyst system of the present invention has as a component at least one metallocene. As used herein "metallocene" refers generally to compounds represented by the formula $Cp_mMR_nX_q$ wherein Cp is a cyclopentadienyl ring which may be substituted, or derivative thereof which may be substituted, M is a Group 4, 5, or 6 transition metal, for example titanium, zirconium, halfnium, vanadium, niobium, tantalum, chromium, molybdenum and tungsten, R is a hydrocarbyl group or hydrocarboxy group having from one to 20 carbon atoms, X is a halogen or hydrogen, and m=1–3, n=0–3, q=0–3, and the sum of m+n+q is equal to the oxidation state of the transition metal.

Methods for making and using metallocenes are disclosed in, for example U.S. Pat. Nos. 4,530,914; 4,542,199; 4,769, 910; 4,808,561; 4,871,705; 4,933,403; 4,937,299; 5,017, 714; 5,026,798; 5,057,475; 5,120,867; 5,278,119; 5,304, 614; 5,324,800; 5,350,723; 6,143,686; and 5,391,790.

One embodiment of the metallocenes used in the catalyst system of the invention are represented by the structure (1):

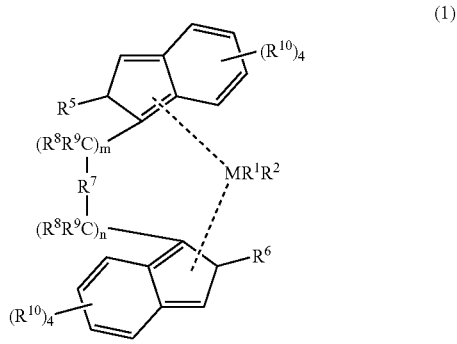

(1)

wherein M is a metal of Group 4, 5, or 6 of the Periodic Table, zirconium (Zr), halfnium (Hf) or titanium (Ti) in one embodiment.

In structure (1), $R^1$ and $R^2$ are identical or different, and are one of a hydrogen atom, a $C_1$–$C_{10}$ alkyl group, a $C_1$–$C_3$ alkyl group in another embodiment, a $C_1$–$C_{10}$ alkoxy group, a $C_1$–$C_3$ alkoxy group in another embodiment, a $C_6$–$C_{10}$ aryl group, a $C_6$–$C_8$ aryl group in another embodiment, a $C_6$–$C_{10}$ aryloxy group, a $C_6$–$C_8$ aryloxy group in another embodiment, a $C_2$–$C_{10}$ alkenyl group, a $C_2$–$C_4$ alkenyl group in another embodiment, a $C_7$–$C_{40}$ arylalkyl group, a $C_7$–$C_{10}$ arylalkyl group in another embodiment, a $C_7$–$C_{40}$ alkylaryl group, a $C_7$–$C_{12}$ alkylaryl group in another embodiment, a $C_8$–$C_{40}$ arylalkenyl group, a $C_8$–$C_{12}$ arylalkenyl group in another embodiment, or a halogen atom, preferably chlorine. In another embodiment, $R_1$ and $R_2$ can be an alkyl diene or other diene compound that is able to provide two points of unsaturation for association with the metal center M of (1).

In structure (1), $R^5$ and $R^6$, being in the so called "2" position on the indenyl ring, are identical or different and are one of a halogen atom, a fluorine, chlorine or bromine atom in one embodiment, a $C_1$–$C_{10}$ alkyl group, a $C_1$–$C_4$ alkyl group in another embodiment, which may be halogenated, a $C_6$–$C_{10}$ aryl group, which may be halogenated, a $C_6$–$C_8$ aryl group in another embodiment, a $C_2$–$C_{10}$ alkenyl group, a $C_2$–$C_4$ alkenyl group in another embodiment, a $C_7$–$C_{40}$ arylalkyl group, a $C_7$–$C_{10}$ arylalkyl group in another embodiment, a $C_7$–$C_{40}$ alkylaryl group, a $C_7$–$C_{12}$ alkylaryl group in another embodiment, a $C_8$–$C_{40}$ arylalkenyl group, a $C_8$–$C_{12}$ arylalkenyl group in another embodiment, a $-NR_2^{15}$, $-SR^{15}$, $-OR^{15}$, $-OSiR_3^{15}$ or $-PR_2^{15}$ radical, wherein $R^{15}$ is one of a halogen atom, a chlorine atom in another embodiment, a $C_1$–$C_{10}$ alkyl group, a $C_1$–$C_3$ alkyl group in another embodiment, or a $C_6$–$C_{10}$ aryl group, a $C_6$–$C_9$ aryl group in another embodiment.

Also, in structure (1), $R^7$ is

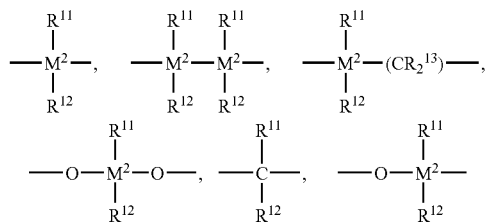

$-B(R^{11})-$, $-Al(R^{11})-$, $-Ge-$, $-Sn-$, $-O-$, $-S-$, $-SO-$, $-SO_2-$, $-N(R^{11})-$, $-CO-$, $-P(R^{11})-$, or $-P(O)(R^{11})-$, wherein $R^{11}$, $R^{12}$ and $R^{13}$ are identical or different and are a hydrogen atom, a halogen atom, a $C_1$–$C_{20}$ alkyl group, a $C_1$–$C_{10}$ alkyl group in another embodiment, a $C_1$–$C_{20}$ fluoroalkyl group, a $C_1$–$C_{10}$ fluoroalkyl group in another embodiment, a $C_6$–$C_{30}$ aryl group, a $C_6$–$C_{20}$ aryl group in another embodiment, a $C_6$–$C_{30}$ fluoroaryl group, a $C_6$–$C_{20}$ fluoroaryl group in another embodiment, a $C_1$–$C_{20}$ alkoxy group, a $C_1$–$C_{10}$ alkoxy group in another embodiment, a $C_2$–$C_{20}$ alkenyl group, a $C_2$–$C_{10}$ alkenyl group in another embodiment, a $C_7$–$C_{40}$ arylalkyl group, a $C_7$–$C_{20}$ arylalkyl group in another embodiment, a $C_8$–$C_{40}$ arylalkenyl group, a $C_8$–$C_{22}$ arylalkenyl group in another embodiment, a $C_7$–$C_{40}$ alkylaryl group, a $C_7$–$C_{20}$ alkylaryl group in another embodiment, or $R^{11}$ and $R^{12}$, or $R^{11}$ and $R^{13}$, together with the atoms binding them, can form ring systems.

In structure (1), $M^2$ is silicon (Si), germanium (Ge) or tin (Sn), silicon (Si) or germanium (Ge) in one embodiment, and most desirably silicon (Si). Also, $R^8$ and $R^9$ are identical or different and have the meanings stated for $R^{11}$. Further, m and n are identical or different and are zero, 1 or 2, zero or 1 in one embodiment, and m plus n being zero, 1 or 2, desirably zero or 1.

Finally, in structure (1), the radicals $R^{10}$ are identical or different and have the meanings stated for $R^{11}$, $R^{12}$ and $R^{13}$. In one embodiment, $R^{10}$ is a phenyl group. The $R^{10}$ group or groups can be substituted on any position or positions on the indenyl ring system that is not already substituted as described above. Two adjacent $R^{10}$ radicals can be joined together to form a ring system, preferably a ring system containing from 4–6 carbon atoms.

Alkyl refers to straight or branched chain saturated, non-aromatic hydrocarbyl substituents. Alkenyl refers to strait or branched chain unsaturated substituents. Halogen (halogenated) refers to fluorine, chlorine, bromine or iodine atoms, preferably fluorine or chlorine. Aryl refers to cyclic aromatic moieties such as phenyl or naphthyl. Alkylaryl refers to an alkyl-substituted aryl moiety, and arylalky refers to an aryl-substituted alkyl moiety.

In another embodiment, the metallocene component is a compound of the structures (2) or (3):

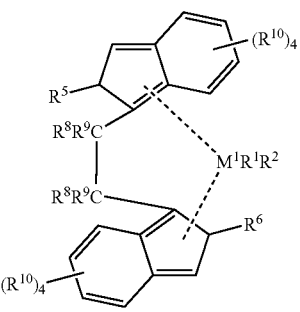

(2)

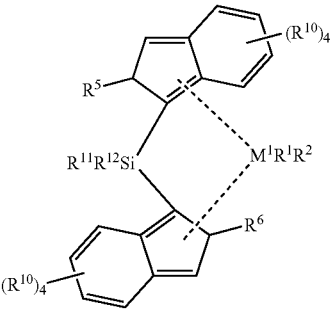

(3)

wherein $M^1$ is zirconium (Zr) or hafnium (Hf), $R^1$ and $R^2$ are methyl or chlorine, and $R^5$, $R^6$, $R^8$, $R^9$, $R^{10}$, $R^{11}$ and $R^{12}$ have the above-mentioned meanings.

The molecules represented by structures (1) through (3) can exist as both chiral and achiral structures. These chiral metallocenes may be used as a racemic (rac) mixture for the preparation of highly isotactic polyolefinic polymers such as isotactic polypropylene homopolymer or copolymer. It is also possible to use the pure R or S form. An optically active polymer can be prepared with these pure stereoisomeric forms. Preferably, the meso form of the metallocene is removed to ensure stereoregular polymerization takes place when the metallocene is used as a polymerization catalyst. For special products it is also possible to use rac/meso mixtures. Separation of the stereoisomers can be accomplished by known literature techniques.

Illustrative but non-limiting examples of the at least one metallocene component of the catalyst system includes the following:

Dimethylsilandiylbis(2-methyl-4-phenyl-1-indenyl)zirconium dichloride

Dimethylsilandiylbis(2-methyl-4,5-benzoindenyl)zirconium dichloride;

Dimethylsilandiylbis(2-methyl-4,6-diisopropylindenyl)zirconium dichloride;

Dimethylsilandiylbis(2-ethyl-4-phenyl-1-indenyl)zirconium dichloride;

Dimethylsilandiylbis(2-methyl-4-(α-naphthyl)-1-indenyl)zirconium dichloride

Dimethylsilandiylbis(2-ethyl-4-(α-naphthyl)-1-indenyl)zirconium dichloride

Dimethylsilandiylbis(2-methyl-4-(β-naphthyl)-1-indenyl)zirconium dichloride,

Dimethylsilandiylbis(2-ethyl-4-(β-naphthyl)-1-indenyl)zirconium dichloride

Phenyl(methyl)silandiylbis(2-methyl-4-phenyl-1-indenyl)zirconium dichloride,

Dimethylsilandiylbis(2-methyl-4-(1-naphthyl)-1-indenyl)zirconium dichloride,

Dimethylsilandiylbis(2-methyl-4-(2-napbthyl)-1-indenyl)zirconium dichloride,

Dimethylsilandiylbis(2-methyl-indenyl)zirconium dichloride,

Dimethylsilandiylbis(2-methyl-4,5-diisopropyl-1-indenyl)zirconium dichloride,

Dimethylsilandiylbis(2,4,6-trimethyl-1-indenyl)zirconium dichloride,

Phenyl(methyl)silandiylbis(2-methyl-4,6-diisopropyl-1-indenyl)zirconium dichloride, 1,2-Ethandiylbis(2-methyl-4,6-diisopropyl-1-indenyl)zirconium dichloride, 1,2-Butandiylbis(2-methyl-4,6-diisopropyl-1-indenyl)zirconium dichloride, Dimethylsilandiylbis(2-methyl-4-ethyl-1-indenyl)zirconium dichloride, Dimethylsilandiylbis(2-methyl-4-isopropyl-1-indenyl)zirconium dichloride, Dimethylsilandiylbis(2-methyl-4-t-butyl 1-indenyl)zirconium dichloride, Phenyl(methyl)silandiylbis(2-methyl-4-isopropyl-1-indenyl)zirconium dichloride, Dimethylsilandiylbis(2-ethyl-4-methyl-1-indenyl)zirconium dichloride, Dimethylsilandiylbis(2,4-dimethyl-1-indenyl)zirconium dichloride, Dimethylsilandiylbis(2-methyl-4-ethyl-1-indenyl)zirconium dichloride, Dimethylsilandiylbis(2-methyl-4-(5-acenaphthyl)-1-indenyl)zirconium dichloride,
Phenyl(methyl)silandiylbis(2-methyl-4,5-benzo-1-indenyl)zirconium dichloride,
Phenyl(methyl)silandiylbis(2-methyl-4,5-(methylbenzo)-1-indenyl)zirconium dichloride,
Phenyl(methyl)silandiylbis(2-methyl-4,5-(tetramethylbenzo)-1-indenyl)zirconium dichloride,
Phenyl(methyl)silandiylbis(2-methyl-4-(5-acenaphthyl)-1-indenyl)zirconium dichloride,
1,2-Ethandiylbis(2-methyl-4,5-benzo-1-indenyl)zirconium dichloride,
1,2-Butandiylbis(2-methyl-4,5-benzo-1-indenyl)zirconium dichloride,
Dimethylsilandiylbis(2-methyl-4,5-benzo-1-indenyl)zirconium dichloride,
1,2-Ethandiylbis(2,4,7-trimethyl-1-indenyl)zirconium dichloride,
Dimethylsilandiylbis(2-methyl-1-indenyl)zirconium dichloride,
1,2-Ethandiylbis(2-methyl-1-indenyl)zirconium dichloride,
Phenyl(methyl)silandiylbis(2-methyl-1-indenyl)zirconium dichloride,
Diphenylsilandiylbis(2-methyl-1-indenyl)zirconium dichloride,
1,2-Butandiylbis(2-methyl-1-indenyl)zirconium dichloride,
Dimethylsilandiylbis(2-ethyl-1-indenyl)zirconium dichloride,
Dimethylsilandiylbis(2-methyl-5-isobutyl-1-indenyl)zirconium dichloride,
Phenyl(methyl)silandiylbis(2-methyl-5-isobutyl-1-indenyl)zirconium dichloride,
Dimethylsilandiylbis(2-methyl-5-t-butyl-1-indenyl)zirconium dichloride,
Dimethylsilandiylbis(2,5,6-trimethyl-1-indenyl)zirconium dichloride,
Dimethylsilandiylbis(2-methyl-4-phenyl-1-indenyl)zirconium dimethyl,
Dimethylsilandiylbis(2-methyl-4,5-benzoindenyl)zirconium dimethyl;
Dimethylsilandiylbis(2-methyl-4,6-diisopropylindenyl)zirconium dimethyl;
Dimethylsilandiylbis(2-ethyl-4-phenyl-1-indenyl)zirconium dimethyl;
Dimethylsilandiylbis(2-methyl-4-α-naphthyl)-1-indenyl)zirconium dimethyl
Dimethylsilandiylbis(2-ethyl-4-(α-naphthyl)-1-indenyl)zirconium dimethyl
Dimethylsilandiylbis(2-methyl-4-(β-naphthyl)-1-indenyl)zirconium dimethyl,
Dimethylsilandiylbis(2-ethyl-4-(β-naphthyl)-1-indenyl)zirconium dimethyl
Phenyl(methyl)silandiylbis(2-methyl-4-phenyl-1-indenyl)zirconium dimethyl,
Dimethylsilandiylbis(2-methyl-4-(1-naphthyl)-1-indenyl)zirconium dimethyl,
Dimethylsilandiylbis(2-methyl-4-(2-naphthyl)-1-indenyl)zirconium dimethyl,
Dimethylsilandiylbis(2-methyl-indenyl)zirconium dimethyl,
Dimethylsilandiylbis(2-methyl-4,5-diisopropyl-1-indenyl)zirconium dimethyl,
Dimethylsilandiylbis(2,4,6-trimethyl-1-indenyl)zirconium dimethyl,
Phenyl(methyl)silandiylbis(2-methyl-4,6-diisopropyl-1-indenyl)zirconium dimethyl,
1,2-Ethandiylbis(2-methyl-4,6-diisopropyl-1-indenyl)zirconium dimethyl,
1,2-Butandiylbis(2-methyl-4,6-diisopropyl-1-indenyl)zirconium dimethyl,
Dimethylsilandiylbis(2-methyl-4-ethyl-1-indenyl)zirconium dimethyl,
Dimethylsilandiylbis(2-methyl-4-isopropyl-1-indenyl)zirconium dimethyl,
Dimethylsilandiylbis(2-methyl-4-t-butyl-1-indenyl)zirconium dimethyl,
Phenyl(methyl)silandiylbis(2-methyl-4-isopropyl-1-indenyl)zirconium dimethyl,
Dimethylsilandiylbis(2-ethyl-4-methyl-1-indenyl)zirconium dimethyl,
Dimethylsilandiylbis(2,4-dimethyl-1-indenyl)zirconium dimethyl,
Dimethylsilandiylbis(2-methyl-4-ethyl-1-indenyl)zirconium dimethyl,
Dimethylsilandiylbis(2-methyl-4-(5-acenaphthyl)-1-indenyl)zirconium dimethyl,
Phenyl(methyl)silandiylbis(2-methyl-4,5-benzo-1-indenyl)zirconium dimethyl,
Phenyl(methyl)silandiylbis(2-methyl-4,5-(methylbenzo)-1-indenyl)zirconium dimethyl,
Phenyl(methyl)silandiylbis(2-methyl-4,5-(tetramethylbenzo)-1-indenyl)zirconium dimethyl,
Phenyl(methyl)silandiylbis(2-methyl-4-(5-acenaphthyl)-1-indenyl)zirconium dimethyl,
1,2-Ethandiylbis(2-methyl-4,5-benzo-1-indenyl)zirconium dimethyl,
1,2-Butandiylbis(2-methyl-4,5-benzo-1-indenyl)zirconium dimethyl,
Dimethylsilandiylbis(2-methyl-4,5-benzo-1-indenyl)zirconium dimethyl,
1,2-Ethandiylbis(2,4,7-trimethyl-1-indenyl)zirconium dimethyl,
Dimethylsilandiylbis(2-methyl-1-indenyl)zirconium dimethyl,
1,2-Ethandiylbis(2-methyl-1-indenyl)zirconium dimethyl,
Phenyl(methyl)silandiylbis(2-methyl-1-indenyl)zirconium dimethyl,
Diphenylsilandiylbis(2-methyl-1-indenyl)zirconium dimethyl,
1,2-Butandiylbis(2-methyl-1-indenyl)zirconium dimethyl,
Dimethylsilandiylbis(2-ethyl-1-indenyl)zirconium dimethyl,
Dimethylsilandiylbis(2-methyl-5-isobutyl-1-indenyl)zirconium dimethyl,
Phenyl(methyl)silandiylbis(2-methyl-5-isobutyl-1-indenyl)zirconium dimethyl,
Dimethylsilandiylbis(2-methyl-5-t-butyl-1-indenyl)zirconium dimethyl,
Dimethylsilandiylbis(2,5,6-trimethyl-1-indenyl)zirconium dimethyl, and the like.

These metallocene catalyst components are described in detail in U.S. Pat. Nos. 6,143,686, 5,145,819; 5,243,001; 5,239,022; 5,329,033; 5,296,434; and 5,276,208; and 5,374,752; and EP 549 900 and 576 970. Typically, these metallocenes can be described as bis(substituted-indenyl) metallocenes. In one embodiment of the invention, a bis(substituted-indenyl) metallocene is a component of the catalyst system, the bis(substituted-indenyl) metallocene including both the dichloride and dimethyl-Group 4 metal.

In yet another embodiment of the invention, the metallocene component is a bridged 2,4 di-substituted indenyl metallocene, wherein at least the 2 and 4 positions on the indenyl ring are substituted as described in structure (1). Examples of such metallocenes are rac-:

Dimethylsilandiylbis(2-methyl-4-phenyl-1-indenyl)zirconium dichloride,
Dimethylsilandiylbis(2,4-dimethylindenyl)zirconium dichloride,
Dimethylsilandiylbis(2,5,6-trimethylindenyl)zirconium dichloride,
Dimethylsilandiylbis(4,5,6,7-tetrahydroindenyl)zirconium dichloride,
Dimethylsilandiylbis(2-methyl-4,5-benzoindenyl)zirconium dichloride,
Dimethylsilandiylbis(2-methyl-4-phenyl-1-indenyl)zirconium dimethyl,
Dimethylsilandiylbis(2-methyl-4,5-benzoindenyl)zirconium dimethyl,
Dimethylsilandiylbis(2-methyl-4,6-diisopropylindenyl)zirconium dimethyl,
Dimethylsilandiylbis(2-ethyl-4-phenyl-1-indenyl)zirconium dimethyl,
Dimethylsilandiylbis(2-methyl-4-(α-naphthyl)-1-indenyl)zirconium dimethyl,
Dimethylsilandiylbis(2-methyl-4-(β-naphthyl)-1-indenyl)zirconium dimethyl,
Phenyl(methyl)silandiylbis(2-methyl-4-phenyl-1-indenyl)zirconium dimethyl,
Dimethylsilandiylbis(2-methyl-4-(1-naphthyl)-1-indenyl)zirconium dimethyl,
Dimethylsilandiylbis(2-methyl-4-(2-naphthyl)-1-indenyl)zirconium dimethyl, and
Dimethylsilandiylbis(2-methyl-indenyl)zirconium dimethyl.

In yet another embodiment of the invention, the metallocene component is a bridged 4-phenyl-1-indenyl substituted metallocene such as dimethylsilandiylbis(2-methyl-4-phenyl-1-indenyl)zirconium dichloride and phenyl(methyl)silandiylbis(2-methyl-4-phenyl-1-indenyl)zirconium dimethyl, and the like, wherein the 2-position is substituted as described in structure (1), and the 4-position is phenyl substituted. The bridged 4-phenyl-1-indenyl substituted metallocene may be described in structure (4):

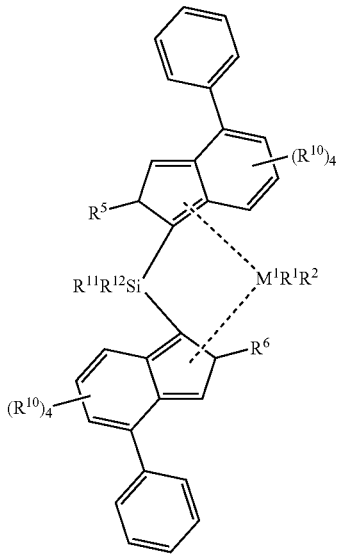

(4)

wherein $R^5$, $R^6$, $R^{10}$, $R^{11}$ and $R^{12}$ are as defined above, $M^1$ is zirconium (Zr) or halfnium (Hf), and $R^1$ and $R^2$ are either a halogen, hydrogen, or methyl, the phenyl group is in the so called "4" position on the indenyl ring. $R^5$ and $R^6$ are $C_1$ to $C_5$ alkyl groups in a desirable embodiment. Embodiments of the structure (3) are dimethylsilandiylbis(2-methyl-4-phenyl-1-indenyl)zirconium dichloride, phenyl(methyl)silandiylbis(2-methyl-4-phenyl-1-indenyl)zirconium dichloride dimethylsilandiylbis(2-methyl-4-phenyl-1-indenyl) zirconium dimethyl, and phenyl(methyl)silandiylbis(2-methyl-4-phenyl-1-indenyl)zirconium dimethyl. When $R^1$ and/or $R^2$ are halogens such as chloride, the catalyst system desirably includes a Lewis Acid such as an alkyl aluminum compound, an example of which include triethylaluminum (TEAL) and methylaluminumoxane (MAO).

The metallocene component selected for use in the catalyst system of this invention is a metallocene which, when used alone, produces isotactic, crystalline propylene polymer and when used in combination with another metallocene, produces polymer having the attributes desired for the particular application of interest. Desirable metallocenes are those selected from formulas 2 and/or 3 which when used alone to produce propylene homopolymer, are capable of producing an isotactic polymer having a weight average molecular weight of from 25,000 to 200,000 at commercially attractive temperatures of from 50° C. to 120° C.

In another embodiment of the invention, a comonomer may be used with propylene to form a copolymer suitable for the fiber and fabric. The metallocenes used may show different molecular weight responses when in the presence of comonomer. This will also affect the molecular weight distribution of the product. For example, we have found that the incorporation of up to 5 wt % comonomer such as a $C_2$ to $C_{12}$ α-olefin comonomer in one embodiment, and up to 5 wt % ethylene comonomer in another embodiment, during the polymerization process as described herein results in a substantial broadening of the molecular weight distribution at the high molecular weight end.

Additional broadening of molecular weight distribution may be practiced through reactor process techniques. For example, operating the different stages of a multiple stage polymerization process with varying levels of hydrogen, a molecular weight regulator, is known in the art to produce broadening of molecular weight distribution. Also, the resin may be spiked post blend with a Ziegler-Natta produced polymer, or other polymer having a very low or high MFR.

In another embodiment of the invention, a comonomer may be used with propylene to form a copolymer suitable for the fiber and fabric. The metallocenes used may show different molecular weight responses when in the presence of comonomer. This will also affect the molecular weight distribution of the product. For example, we have found that the incorporation of up to 10 wt % comonomer such as a $C_2$ to $C_{12}$ α-olefin comonomer in one embodiment, and up to 5 wt % ethylene comonomer in another embodiment, during the polymerization process as described herein results in a substantial broadening of the molecular weight distribution at the high molecular weight end.

Activators

Embodiments of the activator component are herein described. Metallocenes are generally used in combination with some form of activator in order to create an active catalyst system. The term "activator" is defined herein to be any compound or component, or combination of compounds or components, capable of enhancing the ability of one or more metallocenes to polymerize olefins to polyolefins.

In one embodiment, ionizing activators are used to activate the metallocenes. These activators can be "non-ionic" or "ionic" (also called non-coordinating anion activators or NCA activators). The ionic activators are compounds such as tri(n-butyl)ammonium tetrakis(pentaflurophenyl)boron, which ionize the neutral metallocene compound. Such ionizing compounds may contain an active proton, or some other cation associated with but not coordinated or only loosely associated with the remaining ion of the ionizing compound. Combinations of activators may also be used, for example, alumoxane and ionizing activators in combinations, see for example, WO 94/07928. The non-ionic activator precursors that can serve as the NCA activators are strong Lewis acids with non-hydrolyzable ligands, at least one of which is electron-withdrawing, such as those Lewis acids known to abstract an anionic fragment from dimethyl zirconocene (biscyclopentadienyl zirconium dimethyl) e.g., trisperfluorophenyl boron, trisperfluoronaphthylboron, or trisperfluorobiphenyl boron, and other highly fluorinated trisaryl boron compounds.

The term "non-coordinating anion" describes an anion which either does not coordinate to the cationic metallocene or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituents or fragment to the cation so as to cause it to form a neutral four coordinate metallocene compound and a neutral by-product from the anion. Non-coordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization.

In a desirable embodiment of the invention, the activator and metallocene components are contacted with a support such as a silicon or fluorided silicon support (discussed further below). Thus, these NCA activator precursors typically do not possess any reactive ligands which can be protonated by the hydroxyl groups of the metal oxide (the silanol group proton) of the support, when present. For example, any Group 13 element based Lewis acids having only alkyl, halo, alkoxy, and/or amido ligands, which are readily hydrolyzed in aqueous media, are not suitable. At least one ligand of the NCA activator must be sufficiently electron-withdrawing to achieve the needed acidity, for example, trisperfluorophenyl boron, under typical reaction conditions.

Typical metal/metalloid centers for the NCA activator will include boron, aluminum, antimony, arsenic, phosphorous and gallium. In one embodiment, the NCA activator is a neutral compound comprising a Group 13 metalloid center with a complement of ligands together sufficiently electron-withdrawing such that the Lewis acidity is greater than or equal to that of $AlCl_3$. Examples include trisperfluorophenylboron, tris(3,5-di(trifluoromethyl)phenyl)boron, tris(di-t-butylmethylsilyl)perfluorophenylboron, and other highly fluorinated trisarylboron compounds. Other suitable activators are disclosed by Chen and Marks, 100 *Chemical Reviews* 1392–1434 (2000); Yang et al., 116 *J. Am. Chem. Soc.* 10015–10031 (1994); Yang et al., 113 *J. Am. Chem. Soc.* 3623–3625 (1991); Chien et al. 113 *J. Am. Chem. Soc.* 8570–8571 (1991); Bochmann et al. 12 *Organometallics* 633–640 (1999); Herfert et al. 14 *Makromol. Chem., Rapid Commun.* 91–96 (1993); and in EP 0 704 463 and EP 0 513 380.

The use of ionizing ionic compounds not containing an active proton but capable of producing both the active metallocene cation and a noncoordinating anion is also known. See, EP-A-0 426 637 and EP-A-0 573 403. An additional method of making the ionic catalysts uses ionizing anion pre-cursors which are initially neutral Lewis acids but form the cation and anion upon ionizing reaction with the metallocene compounds, for example the use of tris (pentafluorophenyl) boron. See EP-A-0 520 732. Ionic catalysts for addition polymerization can also be prepared by oxidation of the metal centers of transition metal compounds by anion pre-cursors containing metallic oxidizing groups along with the anion groups, see EP-A-0 495 375. Examples of suitable ionic NCA activators, include:

trialkyl-substituted ammonium salts such as:
 triethylammonium tetraphenylborate;
 tripropylammonium tetraphenylborate;
 tri(n-butyl)ammonium tetraphenylborate;
 trimethylammonium tetrakis(p-tolyl)borate;
 trimethylammonium tetrakis(o-tolyl)borate;
 tributylammonium tetrakis(pentafluorophenyl)borate;
 tripropylammonium tetrakis(o,p-dimethylphenyl)borate;
 tributylammonium tetrakis(m,m-dimethylphenyl)borate;
 tributylammonium tetrakis(p-trifluoromethylphenyl)borate;
 tributylammonium tetrakis(pentafluorophenyl)borate; and
 tri(n-butyl)ammonium tetrakis(o-tolyl)borate;

N,N-dialkyl anilinium salts such as:
 N,N-dimethylanilinium tetrakis(pentafluorophenyl)borate;
 N,N-dimethylaniliniumtetrakis(heptafluoronaphthyl)borate;
 N,N-dimethylanilinium tetrakis(perfluoro-4-biphenyl)borate;
 N,N-dimethylanilinium tetraphenylborate;
 N,N-diethylanilinium tetraphenylborate; and
 N,N-2,4,6-pentamethylanilinium tetraphenylborate;

dialkyl ammonium salts such as:
 di-(isopropyl)ammonium tetrakis(pentafluorophenyl)borate; and
 dicyclohexylammonium tetraphenylborate; and triaryl phosphonium salts such as:
 triphenylphosphonium tetraphenylborate;
 tri(methylphenyl)phosphonium tetraphenylborate; and
 tri(dimethylphenyl)phosphonium tetraphenylborate.

Further examples of suitable ionic NCA activators include:
 tropillium tetrakis(pentafluorophenyl)borate;
 triphenylmethylium tetrakis(pentafluorophenyl)borate;
 benzene (diazonium) tetrakis(pentafluorophenyl)borate;
 tropillium phenyltris(pentafluorophenyl)borate;
 triphenylmethylium phenyl-(trispentafluorophenyl)borate;
 benzene (diazonium) phenyl-tris(pentafluorophenyl)borate;
 tropillium tetrakis(2,3,5,6-tetrafluorophenyl)borate;
 triphenylmethylium tetrakis(2,3,5,6-tetrafluorophenyl)borate;
 benzene (diazonium) tetrakis(3,4,5-trifluorophenyl)borate;
 tropillium tetrakis(3,4,5-trifluorophenyl)borate;

benzene (diazonium) tetrakis(3,4,5-trifluorophenyl)borate;

tropillium tetrakis(3,4,5-trifluorophenyl)aluminate;

triphenylmethylium tetrakis(3,4,5-trifluorophenyl)aluminate;

benzene (diazonium) tetrakis(3,4,5-trifluorophenyl)aluminate;

tropillinum tetrakis(1,2,2-trifluoroethenyl)borate;

triphenylmethylium tetrakis(1,2,2-trifluoroethenyl)borate;

benzene (diazonium) tetrakis(1,2,2-trifluoroethenyl)borate;

tropillium tetrakis(2,3,4,5-tetrafluorophenyl)borate;

triphenylmethylium tetrakis(2,3,4,5-tetrafluorophenyl)borate; and benzene (diazonium) tetrakis(2,3,4,5-tetrafluorophenyl)borate.

In the embodiment where the metallocene component metal ligands include halogen moieties (for example, bis-cyclopentadienyl zirconium dichloride, wherein the $R^1$ and $R^2$ groups in structures 1–3 are a halogen) which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944 and EP-A1-0 570 982 for in situ processes describing the reaction of alkyl aluminum compounds with dihalo-substituted metallocene compounds prior to or with the addition of activating anionic compounds. For example, triethaluminum (TEAL) or MAO can be used to form the in situ reactive metallocene component.

In one embodiment of the catalyst system of the invention, the activator is associated with the fluorided support material to form a fluorided support composition. In another embodiment, the fluorided support material is associated with a metallocene to form a fluorided support composition. In yet another embodiment of the invention, the fluorided support is first associated with an activator, followed by association with a metallocene. In one embodiment, the activator is a non-coordinating anion. In another embodiment, the activator is bound to the fluorided support, wherein the metallocene then associates with the support composition.

Support Composition

The metallocene catalyst systems used in the process of this invention are preferably supported using a porous particulate material, such as for example, talc, inorganic oxides, inorganic chlorides and resinous materials such as polyolefins or other polymeric compounds. In particular, the catalyst system is typically the resultant composition from contacting at least the metallocene component, the activator component, and the support component.

Desirable support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesia, titania, zirconia, and the like.

In one embodiment, the support material is porous silica which has a surface area in the range of from 10 to 700 $m^2/g$, a total pore volume in the range of from 0.1 to 4.0 cc/g and an average particle size in the range of from 10 to 500 μm. Desirably, the surface area is in the range of from 50 to 500 $m^2/g$, the pore volume is in the range of from 0.5 to 3.5 cc/g and the average particle size is in the range of from 20 to 200 μm. In yet another embodiment, the surface area is in the range of from 100 to 400 $m^2/g$, the pore volume is in the range of from 0.8 to 3.0 cc/g and the average particle size is in the range of from 30 to 100 μm. The average pore size of typical porous support materials is in the range of from 10 to 1000 Å. Desirably, a support material is used that has an average pore diameter of from 50 to 500 Å, and from 75 to 350 Å in another embodiment. It may be desirable to dehydrate the silica at a temperature of from 100° C. to 800° C. anywhere from 3 to 24 hours.

In another embodiment of the support, the porous silica is fluorided by treatment with a fluorine compound prior to reacting the support with the metallocene or activator components. The fluorine compounds suitable for providing fluorine for the support are desirably inorganic fluorine containing compounds. Such inorganic fluorine containing compounds may be any compound containing a fluorine atom as long as it does not contain a carbon atom. Particularly desirable are inorganic fluorine containing compounds selected from $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$. Of these, $NH_4BF_4$, $(NH_4)_2SiF_6$ are desirable embodiments.

Ammonium hexafluorosilicate and ammonium tetrafluoroborate fluorine compounds are typically solid particulates as are the silicon dioxide supports. A desirable method of treating the support with the fluorine compound is to dry mix the two components by simply blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after charging to the vessel for dehydration or calcining the support. Accordingly, the fluorine concentration present on the support is in the range of from 0.6 to 3.5 wt % of support.

Another method of treating the support with the fluorine compound is to dissolve the fluorine compound in a solvent, such as water, and then contact the support with the fluorine compound containing solution. When water is used and silica is the support, it is desirable to use a quantity of water which is less than the total pore volume of the support.

Dehydration or calcining of the silica is not necessary prior to reaction with the fluorine compound. Desirably, the reaction between the silica and fluorine compound is carried out at a temperature of from 100° C. to 1000° C., and more desirably from 200° C. to 600° C. for two to eight hours.

The metallocenes, activator and support material may be combined in any number of ways. Suitable support techniques are described in U.S. Pat. No. 5,972,823 and 5,643,847, and WO 00/12565.

Regardless of whether the metallocenes and their activator are separately precontacted or whether the metallocenes and activator are combined at once, the total volume of reaction solution applied to porous support is less than 4 times the total pore volume of the porous support in one embodiment, less than 3 times the total pore volume of the porous support in another embodiment, and in the range of from more than 1 to less than 2.5 times the total pore volume of the porous support in yet another embodiment. Procedures for measuring the total pore volume of porous support are well known in the art. The preferred method is described in 1 EXPERIMENTAL METHODS IN CATALYST RESEARCH 67–96 (Academic Press 1968).

Methods of supporting ionic catalysts comprising metallocene cations and noncoordinating anions are described in WO 91/09882, WO 94/03506, WO 96/04319 and in copending U.S. Ser. No. 09/339,128, filed Jun. 24, 1999, now U.S. Pat. No 6,368,999. The methods generally comprise either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide or fluorided-modified supports such that the Lewis acid becomes bound to the support and a hydrogen of the hydroxy group is available to protonate the metallocene compounds.

The metallocene supported catalyst system may be used directly in polymerization or the catalyst system may be prepolymerized using methods well known in the art. For details regarding prepolymerization, see U.S. Pat. No. 4,923,833 and 4,921,825, EP 0 279 863 and EP 0 354 893.

Polymerization

The metallocene supported catalyst system is useful in coordination polymerization of unsaturated monomers conventionally known to be polymerizable under coordination polymerization conditions. Monomers suitable for the polymer of the invention include ethylene and $C_3$ to $C_{12}$ α-olefins. Such conditions also are well known and include solution polymerization, slurry polymerization, and low pressure gas phase polymerization. The metallocene supported catalysts compositions of the present invention are thus particularly useful in the known operating modes employing fixed-bed, moving-bed, fluid-bed, or slurry processes conducted in single, series or parallel reactors.

The metallocene supported catalyst composition of this invention are particularly suitable for propylene polymerizations. Any process may be used, but propylene polymerizations are most commonly conducted using a slurry processes in which the polymerization medium can be either a liquid monomer, like propylene, or a hydrocarbon solvent or diluent, advantageously aliphatic paraffin such as propane, isobutane, hexane, heptane, cyclohexane, etc. or an aromatic diluent such as toluene. The polymerization temperatures may be those considered low, e.g., less than 50° C., desirably 0° C.–30° C., or may be in a higher range, such as up to 150° C., desirably from 50° C. up to 80° C., or at any ranges between the end points indicated. Pressures can vary from 100 to 700 psia (0.69–4.8 MPa). Additional description is given in U.S. Pat. No. 5,274,056 and 4,182,810, and WO 94/21962.

Propylene homopolymers may be formed with the metallocene supported catalyst composition using conventional polymerization techniques. The microstructure of the homopolymer will desirably possess an isotactic pentad fraction as measured by $^{13}C$ NMR of 90% or greater. Copolymers with ethylene or $C_4$ to $C_{12}$ α-olefins may be formed by introduction of ethylene to the propylene slurry or gas phase polymerization of gaseous propylene and ethylene comonomers. Copolymers with ethylene desirably contain 0.5 to 10 wt % comonomer in one embodiment, and 1 to 5 wt % by weight of total polymer in another embodiment. Stereoregular homopolymers and copolymers of α-olefins may be formed with this system by introduction of the appropriate monomer or monomers to a slurry or bulk propylene process.

Pre-polymerization may also be used for further control of polymer particle morphology in typical slurry or gas phase reaction processes in accordance with conventional teachings. For example such can be accomplished by pre-polymerizing a $C_2$–$C_6$ α-olefin for a limited time, for example, ethylene is contacted with the supported metallocene catalyst composition at a temperature of −15 to 30° C. and ethylene pressure of up to 250 psig (1724 kPa) for 75 min to obtain a polymeric coating on the support of polyethylene of 30,000–150,000 molecular weight. The pre-polymerized catalyst is then available for use in the polymerization processes referred to above. In a similar manner, the activated catalyst on a support coated with a previously polymerized thermoplastic polymer can be utilized in these polymerization processes.

Additionally it is desirable to reduce or eliminate polymerization poisons that may be introduced via feedstreams, solvents or diluents, by removing or neutralizing the poisons. For example, monomer feed streams or the reaction diluent may be pre-treated, or treated in situ during the polymerization reaction, with a suitable scavenging agent. Typically such will be an organometallic compound employed in processes such as those using the Group 13 organometallic compounds of U.S. Pat. No. 5,153,157, WO-A-91/09882 and WO-A-94/03506, noted above, and that of WO-A-93/14132.

Given that various ionic and/or metallic species are used as catalysts and cocatalysts in the polymerization process, the final polymer may have some of these components present. The polymer may be washed (or "deashed") to remove some or all of these materials. The process of washing the polymer is performed after the polymerization process on ambient temperature granules or beads of the homopolymer. In one embodiment, the granules of polymer are washed in a counter current with a solvent such as an alcohol, for example isobutanol (2-methyl-1-propanol), and liquid propylene at a temperature of from 25° C. to 80° C., either in a mixture or alone.

The presence of metals or ionic components in the polymer may be measured—before or after washing—by methods known to those skilled in the art. In one embodiment, the metals can be measured using Inductively Coupled Plasma Atomic Emission Spectroscopy (ICP-AES) (Jobin-Yvon Emission Division of Instrument S.A., Model JY138 Ultrace), while chloride and silicon ions were determined using X-Ray Fluorescence (XRF) (Philips X-Ray Analytical Co, Model PW1404). The instruments are calibrated by determining the intensities of a series of known concentration standards and fitting those values to a calibration curve. For ICP-AES, the samples to be measured were first ashed, then dissolved in an appropriate acidic solution, followed by appropriate dilution to fall within the standard calibration curve. For XRF, compression molded plaques were prepared for chloride (Cl$^-$) and Si determination.

Due to the high reactivity of the catalyst system described herein the polymer and film of the present invention is also characterized in having a relatively low level of metal and ionic recoverables both prior to deashing and after deashing relative to prior art methods of making polymers and films. The aluminum and chlorine recoverables (combined) of the homopolymer of the invention range from less than 25 ppm in one embodiment, less than 15 ppm in another embodiment, and less than 10 ppm in yet another embodiment. In yet another embodiment, the aluminum and chlorine recoverables ranges from 10 ppm to 25 ppm.

Polymer Films

Films of the metallocene polypropylene polymers of the present invention can be formed by conventional processes, preferably by a chill roll casting process. Referring now to FIG. 1, a simplified schematic diagram of a typical casting apparatus 20 is shown. The polymer is extruded by an extruder 22, melt processed through a slot die 24, and melt drawn down by an air knife 26 and chill roll 28. The resulting polymer film is collected on a winder 30. The film thickness can be monitored by a gauge monitor 32, and the film can be edge trimmed by a trimmer 34. One or more optional treaters 36 and 36' can be used to surface treat the film, if desired. Such chill roll casting processes and apparatus are well known in the art, and are described, for example, in THE WILEY ENCYCLOPEDIA OF PACKAGING TECHNOLOGY, (A. L. Brody & K. S. Marsh, Ed., $2^d$ ed., John Wiley & Sons, Inc. 1997).

Preferred films can be formed of the metallocene polypropylene homopolymers and random copolymers as described above. Typical comonomers are selected from ethylene and $C_4$–$C_{12}$ α-olefins in one embodiment, and ethylene and butene in another embodiment. If a comonomer is used, the amount of comonomer is at least 0.5 wt % in one embodiment, and no more than 10 wt % in another embodiment, and from 1 to 5 wt % in another embodiment, the wt % of comonomer-derived units being relative to the total weight of the polymer.

In addition, polymer blends can be used to form the films of the present invention. Such blends can be blends of two or more metallocene polypropylene polymers as described herein, or a blend of a metallocene polypropylene polymer and a Ziegler-Natta polypropylene polymer. Polymer blends of metallocene polypropylenes and Ziegler-Natta polypropylenes readily provide the potential to obtain novel film properties. The polymers are miscible, and thus relatively easy to blend. Such blends can provide enhancements in the clarity, stiffness, tear resistance, and moisture barrier of the polymer film, while maintaining the good heat sealability of a Ziegler-Natta random copolymer.

Polypropylene cast films of the present invention have several significant advantages over prior art films. For general purpose cast films, the main processing and product requirements are high output, high line speed and good draw-down, ability to coextrude, efficient quench, ease of surface treatment or embossment, and good film properties, such as clarity, moisture barrier, toughness, and good organoleptic properties. The narrow MWD of the present metallocene polypropylene polymers gives resultant films higher cast line speeds without draw resonance, a lower concentration of low molecular weight extractables/migratory polymer, and a lower concentration of volatiles, and increased thermal processing stability. The narrow composition distribution of the present polymers and resultant films enables more efficient use of comonomer (if desired) in depressing crystallinity (i.e., lower seal initiation temperature), more uniform comonomer incorporation, leading to decreased "sticky" polymer plating-out on film lines, and a narrower crystal size distribution, resulting in lower haze/increased clarity. Finally, a more narrow tacticity distribution results in low FDA extractables (wider range of packaging opportunities) and potentially stiffer films at the same Tm or SIT (seal initiation temperature).

In one embodiment, the present invention is directed to polypropylene compositions suitable for cast film applications as described above, and cast polypropylene films made therefrom. The film resins preferably have a melt flow rate ("MFR") of from 6–15 dg/min, more preferably of from 9–12 dg/min, with a narrow molecular weight distribution, narrow composition distribution, and increased film clarity (i.e., decreased haze %) compared to prior art Ziegler-Natta polypropylene film resins. In this embodiment, the polypropylene film is cast from an extruded polypropylene polymer, the extruded polypropylene polymer being formed by polymerization with a novel fluorided silica supported catalyst as described above. It should be appreciated that these metallocene polypropylene film resins can be characterized by parameters other than the MFR, MWD and CD described above. One skilled in the art will readily appreciate such parameters, as embodied in the Examples hereinafter, particularly in Examples A–M and the Tables and Figures described therein.

In another embodiment, the present invention provides a process for producing a polypropylene film resin having an MFR of from 6–15 dg/min, preferably of from 9–12 dg/min, with a narrow molecular weight distribution, narrow composition distribution, and increased film clarity compared to prior art Ziegler-Natta polypropylene film resins. Further, the xylene extractables (or solubles) level is less than 2 wt % in one embodiment, less than 1.5 wt % in another embodiment, and less than 1% in another embodiment, the wt % relative to the total polymer. This is a measure of the level of atactic or amorphous polymer present in the polymer composition as a whole. The lower the level of xylene solubles, the more isotactic the polymer.

The process includes the steps of forming a polypropylene polymer by polymerization of propylene monomers in the presence of a fluorided silica supported catalyst, a non-coordinating anion bound to the support, and a bis(substituted indenyl) metallocene bound to or associated with the modified support, and casting the resultant polypropylene to form a cast polypropylene film having the above-described properties.

In another embodiment, the present invention provides a polypropylene film produced by a process including the steps of forming a polypropylene polymer by polymerization of propylene monomers in the presence of a fluorided silica supported catalyst, and casting the resultant polypropylene to form a cast polypropylene film.

In another embodiment, the present invention provides articles of manufacture formed of or including a cast polypropylene film as described herein.

The advantageous properties described above, as well as others that one skilled in the art will appreciate from the present disclosure, are illustrated herein in the following examples.

Test Methods

Film Preparation. Cast films were prepared using the following operations. Cast monolayer films were fabricated on a Killion cast film line. This line has three 24:1 L/D extruders ("A" extruder at 2.54 cm diameter; "B" extruder at 1.91 cm diameter, and "C" extruder at 1.91 cm diameter), which feed polymer into a feedblock. For monolayer cast film production, polymer was fed only into "A" extruder. The feedblock diverts molten polymer form the extruder to a 20.32 cm wide Cloeren die. Molten polymer exits the die and is cast on a chill roll (20.3 cm diameter, 25.4 cm roll face). The cast unit is equipped with adjustable winding speeds to obtain film of the targeted thickness. Film thickness determined using a profilometer; Haze measured per ASTM D 1003; Gloss per ASTM D 2457; WVTR (water vapor transmission rate) per ASTM F 372; Tensile properties and 1% secant modulus by ASTM D 882; Elmendorf tear properties per ASTM D 1922; Puncture resistance per ASTM D 3420; Total energy dart impact resistance per ASTM D 4272.

Molecular Weight and Distribution. Molecular weights and molecular weight distribution (Mw/Mn) was determined using Gel Permeation Chromatography.

Melting Temperature. The melting temperature and crystallization temperature were determined from peak temperatures from differential scanning calorimeter (DSC) runs at 10° C./min. heating and cooling rates.

Melt Flow Rate. MFR was determined via the method of ASTM D 1238-95 Condition L.

Composition Distribution. The composition distribution analysis is measured by a preparative temperature rinsing elution fractionation (TREF) technique in the temperature range of room temperature to 115° C. TREF involves the following steps: dissolving the sample in a good solvent, i.e. tetrachlororethylene at 115° C., cooling the dilute solution slowly to 5° C. at 45 minutes ram time to allow crystallization on a support, and redissolving and washing the sample from the support by heating to 115° C. at 30 minutes ram time during elution. Polymer chains are fractionated by difference in their crystallization temperature in solution, which is a function of composition. A mass detector provides concentration vs. elution temperature data. Therefore, the separation mechanism is based on differences in the degree of crystallinity between copolymer chains. Copolymers with the highest crystallinity will precipitate out of solution first during the cooling, and will re-dissolove last during heating.

Oscillatory Shear. The viscoelasticity of polymer is determined using the Advanced Rheometric Expansion System, ARES, (Rheometric Scientific). Small amplitude oscillatory shear tests were performed utilizing 25 mm parallel plate fixtures at a temperature of 200° C. and over a frequency range that was equal to 0.1–100 rad/s.

Recoverable Compliance. This is measured using a Rhemetric Stress Rheometer. Polymer is melted at 230° C., then stressed at $1\times10^4$ dyne/cm$^2$ stress for 180 seconds. Then the stress is released to zero to allow the polymer to recover the deformation. The recoverable compliance is the strain normalized by the stress recovery.

Xylene Solubles. Xylene solubles were determined by 21 CFR 177.1520 (d)(4)(i).

EXAMPLES

The following examples are presented to illustrate the foregoing discussion. All parts, proportions and percentages are by weight unless otherwise indicated. Although the examples may be directed to certain embodiments of the present invention, they are not to be viewed as limiting the invention in any specific respect. Particular polymer embodiments are labeled either "Sample 1, Sample 2, . . ." or "S1, S2, . . .". Comparative polymer embodiments are labeled either "Comparative Sample 1, Comparative Sample 2 . . ." or "C1, C2, . . .". Embodiments of using the samples as a film, and testing of their properties, are labeled either as "Example A, Example B, . . .".

Preparation of Fluorided Silica. 48.5 grams of SiO$_2$ (Grace Davison, a subsidiary of W. R. Grace Co., Conn.) as Sylopol®952 ("952 silica gel") having a N$_2$ pore volume 1.63 cc/g and a surface area of 312 m$^2$/g, was dry mixed with 1.5 grams ammonium hexafluorosilicate (Aldrich Chemical Company, Milwaukee Wis.). The ammonium hexafluorosilicate added corresponds to 1.05 millimole F per gram silica gel. The mixture was transferred to a 5 cm ID by 50 cm vycor glass tube having a medium frit plug 3.8 cm from one end. The tube was inserted into a tube furnace and flow of N$_2$ (220 cc/min) was passed up through the frit to fluidize the silica bed. The furnace was heated according to the following schedule:

Raise the temperature from 25 to 150° C. over 5 hours
Hold the temperature at 150° C. for 4 hours
Raise the temperature from 150 to 500° C. over 2 hours
Hold the temperature at 500° C. for 4 hours
Heat off and allow to cool under N$_2$
When cool, the fluorided silica was stored under N$_2$.

Preparation of Catalyst used for Samples. In a nitrogen purged glove box, 394.32 grams of fluorided silica was massed and placed in a 3-neck 4L reactor equipped with an overhead stirrer. 2L of dry toluene was added and the mixture was vigorously stirred. 27.6 ml of N,N-diethyl aniline was added via syringe. 86.0 grams of tris(perfluorophenyl)boron was added as a solid. The mixture was stirred for 1 hour. 5.99 grams of Dimethylsilylbis(2-methyl-4-phenyl indenyl)zirconium dimethyl was added and the mixture was stirred for 2 hours. The solvent was decanted and the solid was vacuum dried overnight. Yield: 423 grams. Catalyst loading was found to be 0.02 mmol of transition metal per gram of finished catalyst.

Sample 1. The finished catalyst composition was oil slurried with Drakeol™ white mineral oil (Witco Chemical) for ease of addition to the reactor. The procedure for polymerizing Sample 1 was as follows. The polymerization was conducted in a pilot scale, two reactor, continuous, stirred tank, bulk liquid-phase process. The reactors were equipped with jackets for removing the heat of polymerization. The reactor temperature was set at 74° C. in the first reactor and 68° C. in the second reactor. Catalyst was fed at a rate of 1.4 g/hr. TEAL (1 wt % in hexane) was used as a scavenger at a rate of 4.1 cc/min. The catalyst system prepared above was fed as a 10% slurry in mineral oil and was flushed into the reactor with propylene. Propylene monomer was fed to the first reactor at a rate of 79 kg/hr and to the second reactor at a rate of 32 kg/hr. Hydrogen was added for molecular weight control at 2400 mppm in the first reactor and 3200 mppm in the second reactor. Reactor residence time was 2.5 hours in the first reactor and 1.9 hours in the second reactor. Polymer production rates were 29 kg/hr in the first reactor and 14 kg/hr in the second reactor. The polymerized granular product was subsequently washed with liquid propylene fed to the extractor at 45 kg/hr flow rate. Polymer was discharged from the reactors as granular product having a MFR of 10.0 dg/min. 68% of the final polymer product was derived from the first stage and 32% of the final polymer product was derived from the second stage.

Given that catalyst is fed at a rate of from 0.5 to 3 g/hr in an embodiment of the invention, supported fluorided catalyst and fluorided support material will be present in the polypropylene product. In one embodiment, the support material is present, on a basis of the amount of silicon (Si), from 10 to 100 ppm prior to deashing (washing), and from 20 to 65 ppm in another embodiment, and from 30 to 55 ppm in yet another embodiment.

Sample 2. Sample 2 was prepared in similar fashion as described above for Sample 1. The procedure for polymerizing Sample 2 was the same as for Sample 1 except that propylene monomer was fed to the first reactor at a rate of 79 kg/hr and to the second reactor at a rate of 32 kg/hr, hydrogen was added at 1800 mppm in the first reactor and 2600 mppm in the second reactor, ethylene monomer was fed to the first reactor at 1.77 kg/hr and in the second reactor at 0.73 kg/hr, reactor residence time was 2.5 hours in the first reactor and 1.9 hours in the second reactor, and polymer production rates were 16 kg/hr in the first reactor and 14 kg/hr in the second reactor. Polymer was discharged from the reactors as granular product having a MFR of 7 dg/min and containing 2.1 wt % of ethylene comonomer. 52% of the final polymer product was derived from the first stage and 48% of the final polymer product was derived from the second stage.

Sample 3. Sample 3 was prepared in similar fashion as described above for Sample 1. The procedure for polymerizing Sample 3 was the same as for Sample 1 except that propylene monomer was fed to the first reactor at a rate of 79 kg/hr and to the second reactor at a rate of 32 kg/hr, hydrogen was added at 1800 mppm in the first reactor and 2600 mppm in the second reactor, ethylene monomer was fed to the first reactor at 2.21 kg/hr and in the second reactor at 0.82 kg/hr, reactor residence time was 2.5 hours in the first reactor and 1.9 hours in the second reactor, and polymer production rates were 16 kg/hr in the first reactor and 14 kg/hr in the second reactor. Polymer was discharged from the reactors as granular product having a MFR of 7 dg/min and containing 2.8 wt % of ethylene comonomer. 52% of the final polymer product was derived from the first stage and 48% of the final polymer product was derived from the second stage.

Sample 4. Sample 4 was prepared by the physical blend at 1:1 ratio of metallocene polypropylene as described in Sample 1 and Ziegler-Natta copolymer as described in Comparative Sample 2. The polymer blend was melt mixed with a 25.4 mm single screw extruder at 227° C. to attain a homogeneous mix.

Comparative Sample 1. This polypropylene is a commercially available resin sold by ExxonMobil Chemical Co. (Houston, Tex.), and is catalyzed using Ziegler-Natta catalyst.

Comparative Sample 2. This polypropylene copolymer is a commercially available resin sold by ExxonMobil Chemical Co. (Houston, Tex.), and is catalyzed using Ziegler-Natta catalyst.

Examples A–M

In the following Examples, the metallocene polymers or copolymers are the polymers or copolymers of the present invention as described in the Samples 1–4 (designated by number) and Comparative Samples (designated by C#), as described above. The Ziegler-Natta polymers are prepared according to conventional methods well-known in the art. In these examples, the abbreviation "RCP" is used to indicate a random copolymer, and the abbreviation "Z-N" indicates a Ziegler-Natta polymer.

Example A

Figure 2:
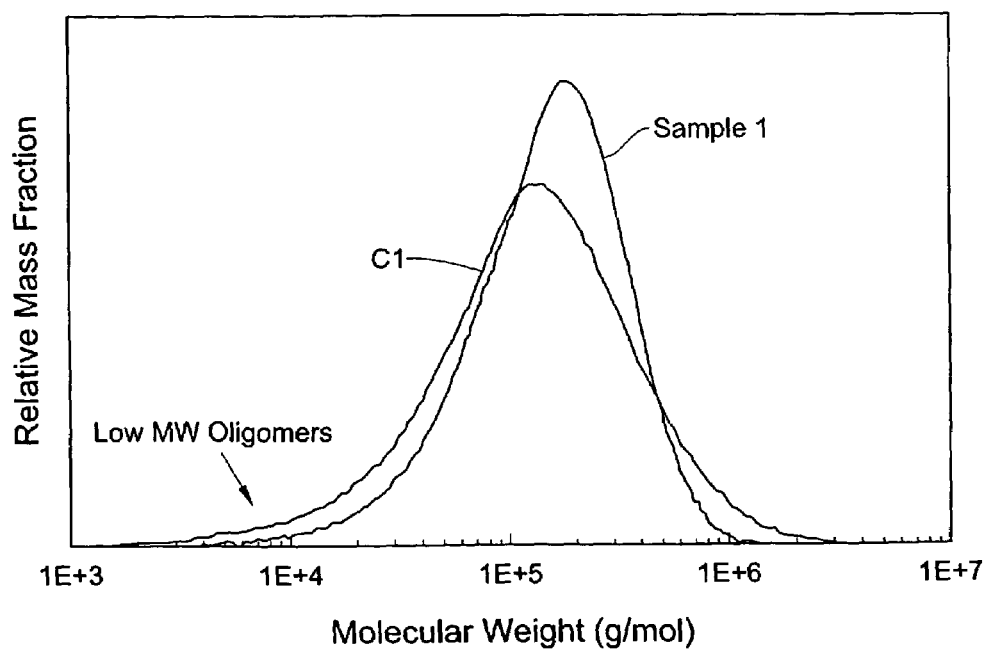
FIG. 2 shows the molecular weight distribution of a metallocene polypropylene polymer of the present invention compared to a Ziegler-Natta polymer having the same MFR.

This Example illustrates the advantageous feature of the present metallocene polypropylene polymers, that the polymers include a very low concentration of low molecular weight oligomers, as compared to Z-N polymers. FIG. 2 shows the molecular weight distribution of a metallocene polypropylene polymer of the present invention having an MFR of 7 dg/min, compared to a Z-N polymer having the same MFR. As the Figure shows, the Mw/Mn of the present polymers is 2.1, significantly less than the Mw/Mn of 3.7 of the Z-N polymer. The Figure clearly shows a significant low MW "tail" on the Z-N catalyst curve, which is absent from the metallocene curve.

Example B

Figure 3:
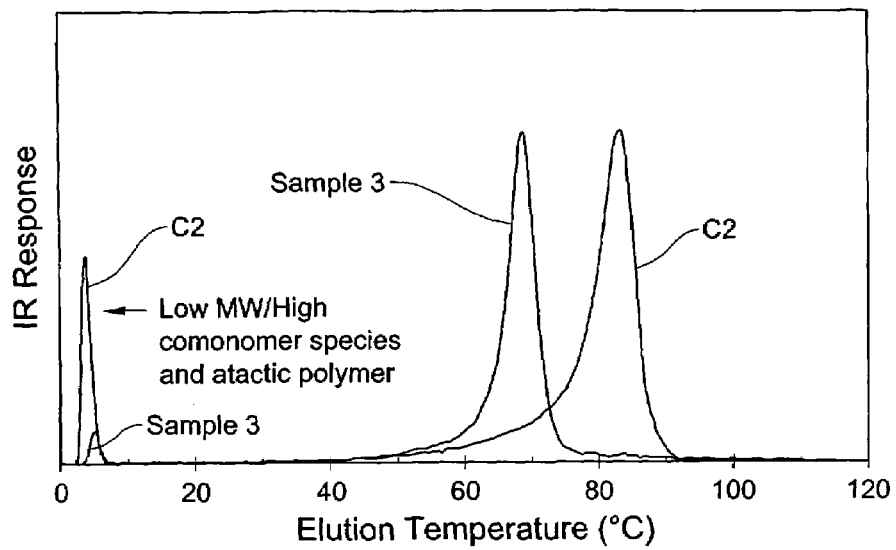
FIG. 3 shows the composition distribution of an invention random copolymer versus a Ziegler-Natta random copolymer.

The key structural differences that distinguish the present metallocene polypropylene polymers from conventional polymers are the narrow MWD, narrow CD, narrow TD (tacticity distribution) and the relative scarcity of chain defects. FIG. 3 shows the composition distribution of an invention metallocene RCP versus a Z-N RCP. The half width of the metallocene RCP peak is narrower than the Z-N one (4.5 versus 6.8° C.), indicating narrower composition distribution.

Example C

Table 1 shows the properties of typical metallocene homopolymers and random copolymers of the present invention, compared to Ziegler-Natta polymers and copolymers. Metallocene propylene polymer has narrower molecular weight distribution, lower recoverable compliance, narrower composition distribution, and a significantly less xylene extractables. In particular, the recoverable compliance for the polymers of the invention is from 0.5 to 1.8 $(Pa^{-1} \times 1^{-4})$ in one embodiment, and from 0.6 to 1.5 $(Pa^{-1} \times 1^{-4})$ in another embodiment. Further, the MWD (Mw/Mn) is less than 3 in one embodiment, less than 2.8 in another embodiment, and less than 2.5 in yet another embodiment.

Example D

Figure 4:
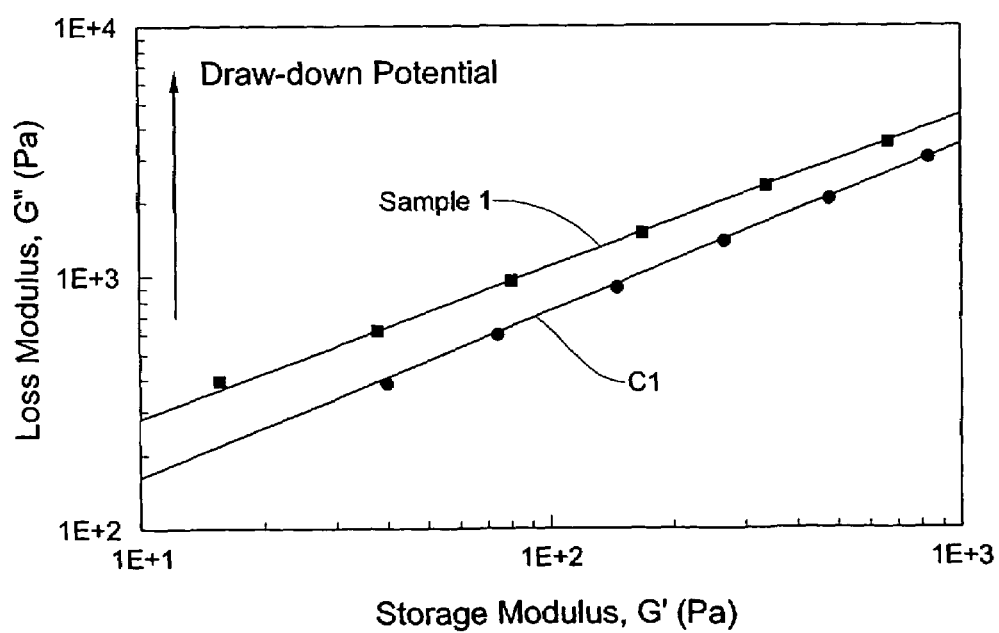
FIG. 4 compares the loss modulus (viscous strain) versus storage modulus (elastic strain) for an invention film and a typical Ziegler-Natta catalyzed film.

The draw-down potential of polymers was determined by the oscillatory shear test and can be gauged in a Cole-Cole plot, as shown in FIG. 4, of loss modulus (viscous strain) versus storage modulus (elastic strain). This representation of the master curve is invariant against the testing temperature, frequency, and molecular weight. The result of the present metallocene polymers having higher viscous strain at a constant elastic strain illustrates the capability of easier draw-down in the high strain rate process. In contrast, the ultra-high molecular weight components of Z-N polymers leads to more chain entanglements and therefore less viscous strain, hindering the rapid draw-down at the high line speed.

Example E

Figure 5:
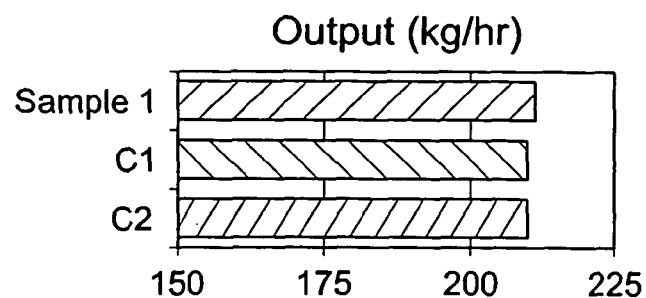
FIG. 5 compares the extrudability of an invention polymer and Ziegler-Natta polymer using a monolayer casting process, using a 89 mm extruder, 107 cm die at 0.635 mm die gap, 125 rpm screw speed and 21° C. chill roll.
Figure 5:
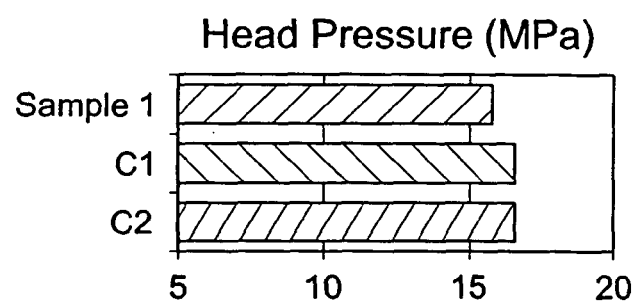
Figure 5:
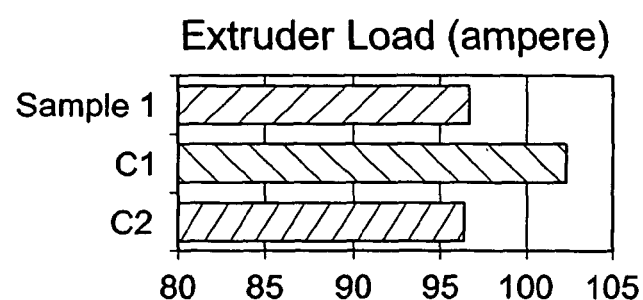
Figure 5:
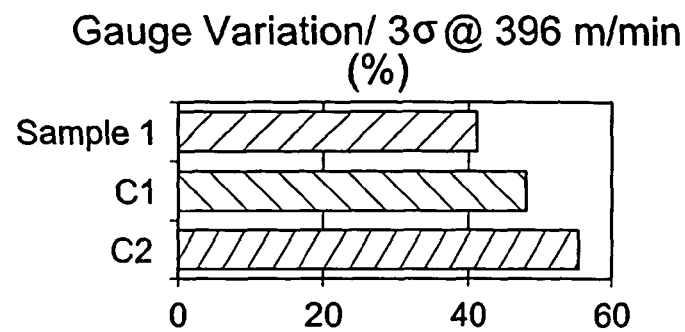

FIG. 5 compares the extrudability of metallocene and Z-N polymers using a monolayer casting process, using a 89 mm extruder, 107 cm die at 0.635 mm die gap, 125 rpm screw speed and 21° C. chill roll. The metallocene polypropylene offers a comparable extrudability over the Z-N polypropylene in terms of similar output, extruder load, head pressure and better gauge uniformity across the film width.

Example F

The maintenance of film clarity and gloss during high line speed cast film processing is a particularly desirable attribute. At higher line speeds, a deterioration of clarity is often encountered in the prior art, due to the shorter quench time for the melt extrudate and the less intimate contact of melt curtain on the chill roll. Metallocene polypropylene polymers offer the advantage of producing clear and glossy cast films without compromising line speeds.

A comparison of film properties is shown in Table 2. The narrow MWD and narrow TD of metallocene polymers results in films having a more uniform distribution of crystal sizes, which reduces the surface roughness and diminishes light scattering from the film. As a consequence, the film clarity and gloss are improved. The films of metallocene polypropylene combine good stiffness, tensile strength, puncture resistance and moisture barrier properties of Ziegler-Natta homopolymers with the good clarity and heat sealability of Ziegler-Natta random copolymers.

Example G

Polymer blends of metallocene polypropylene and Ziegler-Natta polypropylene readily provide the potential to obtain advantageous film properties. The properties of blends of metallocene homopolymers and Z-N random copolymers are shown in Table 3. These properties provide enhancements in clarity, stiffness, tear resistance and moisture barrier, while maintaining the good heat sealability of Ziegler-Natta random copolymers. The total energy dart impact of the blend film is in between those of the neat resins.

Example H

This Example illustrates the ability of metallocene polypropylenes to incorporate comonomers uniformly into the polymer backbone. Such ability opens potential new opportunities to film applications. In the family of random copolymer cast films, the basic requirements include good clarity and sealability. Table 4 shows the film properties of metallocene random copolymers and Ziegler-Natta random copolymers. In comparison, metallocene random copolymers have a unique balance of toughness, stiffness, clarity, low extractable content, and good organoleptic and heat sealability.

Example 1

Figure 6:
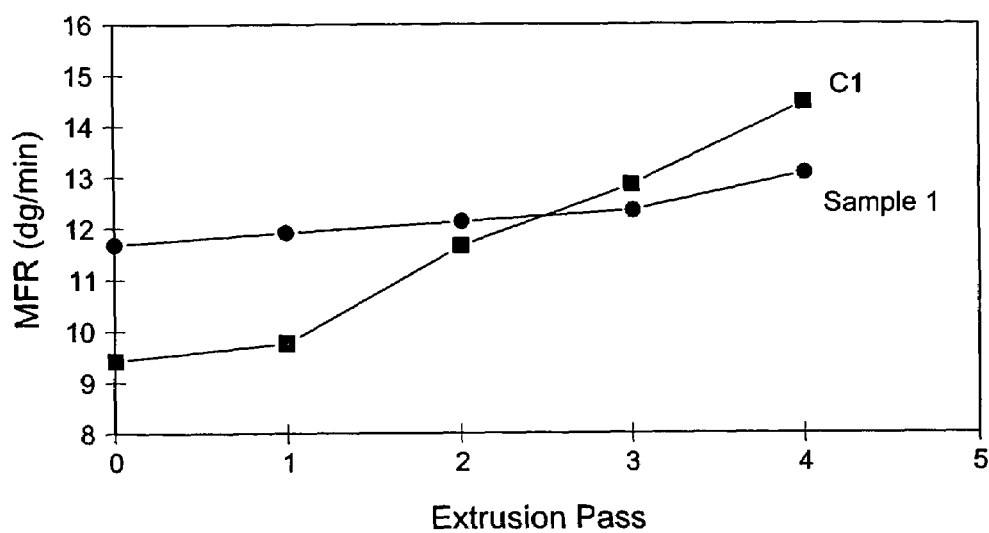
FIG. 6 compares the MFR shift of invention and Ziegler-Natta polymers after multiple extrusions at 260° C.
Figure 7:
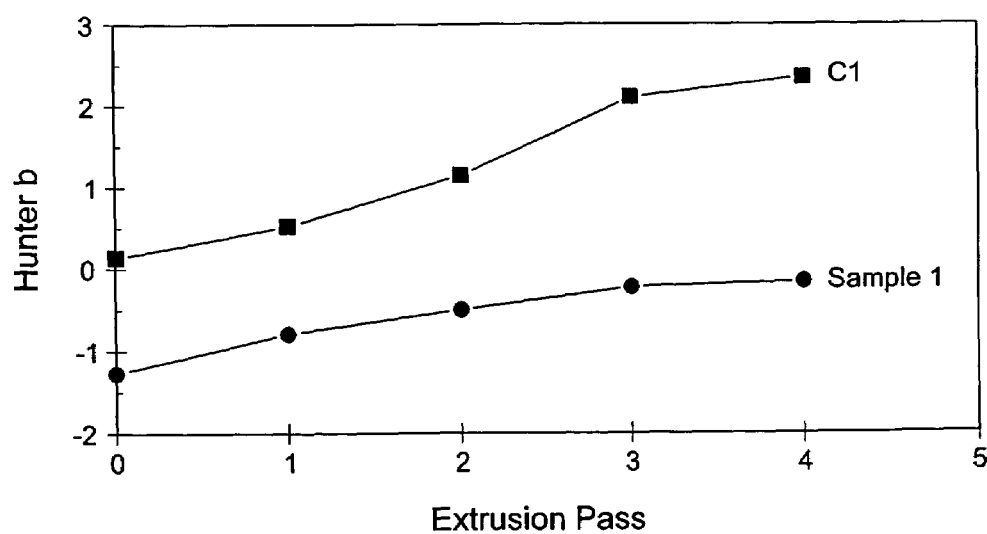
FIG. 7 compares the color shift of invention and Ziegler-Natta polymers after multiple extrusions at 260° C.

This Example illustrates the ability of metallocene polypropylenes to provide significantly better extrusion processing stability, with less volatiles than the conventional Ziegler-Natta polypropylene. This is demonstrated by MFR, color and volatiles shifts after multiple extrusion on 25.4 mm single screw extruder at 260° C., as shown respectively in FIGS. 6, 7 and Table 5.

Metallocene polypropylene has less MFR increase after 4-pass extrusions. This is desirable when recycled materials are mixed into the extrusion system with the virgin resins. Therefore, the mixed polymer in the extruder is more uniform with metallocene polypropylene than Ziegler-Natta polypropylene.

The high processing stability of metallocene polypropylene is also reflected in the lower yellow discoloration of the polymer after multiple-pass extrusions, which is also a desirable attribute.

Due to the less low molecular weight oligomers in the metallocene polypropylene, the volatiles formed after multiple-pass extrusions are significantly less with metallocene than Ziegler-Natta polypropylene. This implies less extrusion fuming, die drool and plating out on chill roll of the film processing equipment.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the true scope of the present invention.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

TABLE 1

Resin properties of propylene Sample and Comparative Sample polymers.

| Resin Property | S1 | S2 | S3 | C1 | C2 |
|---|---|---|---|---|---|
| MFR (dg/min) | 10 | 7 | 7 | 7 | 7 |
| $C_2$ Comonomer (wt %) | 0 | 2.1 | 2.8 | 0 | 2.8 |
| GPC data | | | | | |
| Mn ($\times 10^3$) | 78 | 94 | 94 | 64 | 58 |
| Mw ($\times 10^3$) | 167 | 203 | 195 | 230 | 212 |
| Mz ($\times 10^3$) | 268 | 352 | 309 | 541 | 540 |
| Mw/Mn | 2.2 | 2.2 | 2.1 | 3.6 | 3.7 |
| Mz/Mw | 1.6 | 1.7 | 1.6 | 2.4 | 2.6 |
| DSC data | | | | | |
| Melting Temp. (° C.) | 152 | 135 | 130 | 161 | 146 |
| Heat of Fusion (J/g) | 94 | 89 | 83 | 105 | 76 |
| Crystallization Temp. (° C.) | 115 | 98 | 92 | 112 | 105 |
| Recoverable Compliance ($Pa^{-1} \times 10^{-4}$) | 0.9 | 1.3 | 1.3 | 2.1 | 1.8 |
| Xylene Solubles (wt %) | 0.3 | 0.6 | 0.9 | 3.8 | 5.1 |

TABLE 2

Cast film properties - invention Sample and Z-N propylene homopolymers.

| Film Property | | S1 | C1 |
|---|---|---|---|
| MFR (dg/min) | | 10 | 7 |
| $C_2$ Comonomer (wt %) | | — | — |
| MWD | | 2.2 | 3.6 |
| Thickness (μm) | | 43 | 41 |
| Haze (%) | | 2.3 | 3.9 |
| Gloss @ 45° | | 85 | 79 |
| Heat Seal Temp. @ 10 N/15 mm (° C.) | | 140 | 146 |
| WVTR @ 37.8° C. & 100% RH (g/m²/day per 25.4 μm) | | 12.4 | 13.2 |
| 1% Sec. Modulus (N/mm²) | MD/TD | 931/841 | 862/862 |
| Tensile Strength @ YD (N/mm²) | MD/TD | 21/28 | 24/25 |
| Elongation @ YD (%) | MD/TD | 4.8/4.8 | 4.8/4.8 |
| Tensile Strength @ BK (N/mm²) | MD/TD | 62/58 | 67/50 |
| Elongation @ BK (%) | MD/TD | 443/467 | 411/475 |
| Elmendorf Tear (kN/m) | MD/TD | 16/21 | 12/29 |
| Puncture Resistance (kN/m) | | 929 | 964 |
| Puncture Energy (kJ/m) | | 57 | 52 |
| Total Energy Dart Impact @ 23° C. (J) | | 0.5 | 0.3 |

TABLE 3

Cast film properties - invention Sample and Z-N RCP.

| Film Property | | S4 | C2 |
|---|---|---|---|
| MFR (dg/min) | | 9 | 7 |
| $C_2$ Comonomer (wt %) | | 1.5 | 2.8 |
| MWD | | — | 3.7 |
| Thickness (μm) | | 46 | 43 |
| Haze (%) | | 1.5 | 1.8 |
| Gloss @ 45° | | 89 | 87 |
| Heat Seal Temp. @ 10 N/15 mm (° C.) | | 136 | 132 |
| WVTR @ 37.8° C. & 100% RH (g/m²/day per 25.4 μm) | | 14.1 | 15.8 |
| 1% Sec. Modulus (N/mm²) | MD | 765 | 552 |
| Tensile Strength @ YD (N/mm²) | MD/TD | 22/23 | 18/19 |
| Elongation @ YD (%) | MD/TD | 5.4/5.4 | 5.3/5.5 |
| Tensile Strength @ BK (N/mm²) | MD/TD | 57/48 | 59/45 |
| Elongation @ BK (%) | MD/TD | 681/673 | 678/669 |
| Elmendorf Tear (kN/m) | MD/TD | 17/21 | 11/25 |
| Puncture Resistance (kN/m) | | 876 | 788 |
| Puncture Energy (kJ/m) | | 37 | 34 |
| Total Energy Dart Impact @ 23° C. (J) | | 1.1 | 2.2 |

TABLE 4

Cast film properties - invention Samples and Z-N RCPs.

| Film Property | | S2 | S3 | C2 |
|---|---|---|---|---|
| MFR (dg/min) | | 7 | 7 | 7 |
| C$_2$ Comonomer (wt %) | | 2.1 | 2.8 | 2.8 |
| MWD | | 2.2 | 2.1 | 3.7 |
| Thickness (μm) | | 46 | 46 | 43 |
| Haze (%) | | 0.9 | 0.9 | 1.8 |
| Gloss @ 45° | | 90 | 88 | 87 |
| Heat Seal Temp. @ 10 N/15 mm (° C.) | | 128 | 118 | 132 |
| WVTR @ 37.8° C. & 100% RH (g/m$^2$/day per 25.4 μm) | | 14.3 | 15 | 15.8 |
| 1% Sec. Modulus (N/mm$^2$) | MD | 662 | 600 | 552 |
| Tensile Strength @ YD (N/mm$^2$) | MD/TD | 21/20 | 19/19 | 18/19 |
| Elongation @ YD (%) | MD/TD | 5.7/5.6 | 5.6/5.5 | 5.3/5.5 |
| Tensile Strength @ BK (N/mm$^2$) | MD/TD | 61/53 | 60/57 | 59/45 |
| Elongation @ BK (%) | MD/TD | 717/728 | 691/717 | 678/669 |
| Elmendorf Tear (kN/m) | MD/TD | 17/26 | 16/26 | 11/25 |
| Puncture Resistance (kN/m) | | 876 | 823 | 788 |
| Puncture Energy (kJ/m) | | 38 | 35 | 34 |
| Total Energy Dart Impact @ 23° C. (J) | | 2.2 | 2.4 | 2.2 |

TABLE 5

Effects of multiple extrusions on volitiles for invention Samples and ZN propylene homopolymers.

| Volatiles | S1 Virgin | S1 4th Pass | C1 Virgin | C1 4th Pass |
|---|---|---|---|---|
| C$_1$–C$_5$ | 0 | 1 | 4 | 4 |
| C$_6$ | 0 | 0 | 1 | 1 |
| C$_7$ | 0 | 2 | 11 | 13 |
| C$_8$ | 0 | 0 | 0 | 0 |
| C$_9$ | 0 | 1 | 6 | 6 |
| C$_{10}$ | 0 | 1 | 7 | 7 |
| C$_{11}$ | 0 | 1 | 7 | 7 |
| C$_{12}$ | 11 | 17 | 24 | 31 |
| C$_{13}$ | 0 | 0 | 0 | 0 |
| C$_{14}$ | 0 | 1 | 5 | 6 |
| C$_{15}$ | 0 | 1 | 10 | 11 |
| C$_{15+}$ | 1 | 3 | 26 | 26 |
| Total, wppm | 13 | 28 | 99 | 112 |

We claim:

1. A process for producing a polypropylene cast film, the process comprising: (a) forming a polypropylene polymer having an MFR of from 7 to 10 dg/min, an $M_w M_n$ of less than 3, a xylene solubles level of less than 2 wt %, and a recoverable compliance of from 0.5 to 1.8 (Pa$^{-1}$×10$^{-4}$) by polymerization of propylene monomers in the presence of a metallocene supported catalyst system, and (b) casting the resultant polypropylene to form a cast polypropylene film, wherein the metallocene supported catalyst system comprises a fluorided support composition and a non-coordinating anion bound to the fluorided support composition.

2. The process of claim 1, wherein the metallocene catalyst is represented by the formula: $Cp_m MR_n X_q$ wherein Cp is a cyclopentadienyl ring which may be substituted, or a derivative thereof which maybe substituted, M is a Group 4, 5, or 6 transition metal, R is a hydrocarbyl group or hydrocarboxy group having from one to 20 carbon atoms, X is a halide, a hydride, an alkyl group, an alkenyl group or an arylalkyl group, m=1–3, n=0–3, q=0–3, and the sum of m+n+q is equal to the oxidation state of the transition metal.

3. The process of claim 1, wherein the metallocene is a bis(substituted-indenyl) metallocene.

4. The process of claim 1, wherein the fluorided support composition is selected from fluorided talc, clay, silica, alumina, magnesia, zirconia, iron oxides, boria, calcium oxide, zinc oxide, barium oxide thoria, aluminum phosphate gel, polyvinylchloride or substituted polystyrene, and mixtures thereof.

5. The process of claim 1, wherein the non-coordinating anion is selected from fluorinated tris-arylborane compounds and mixtures thereof.

6. The process of claim 1, wherein the non-coordinating anion is selected from tris-perfluorophenyl borane, trisperfluoronaphthyl borane, trisperfluorobiphenyl borane, tris(3,5-di(trifluoromethyl)phenyl)borane, tris(di-t-butylmethylsilyl)perfluorophenylborane, and mixtures thereof.

7. The process of claim 1, wherein the polypropylene polymer has a xylene solubles level of less than 1.5 wt %.

8. The process of claim 1, wherein there is from 0.5 to 10 wt % of ethylene or C$_4$ to C$_{12}$ α-olefin-derived units present in the polymer, by weight of the total polymer.

9. The process of claim 1, wherein the polymer has a recoverable compliance of from 0.6 to 1.5 (Pa$^{-1}$×10$^{-4}$).

10. The process of claim 1, wherein the polypropylene polymer has an MWD of less than 2.5.

* * * * *